Figure 1:
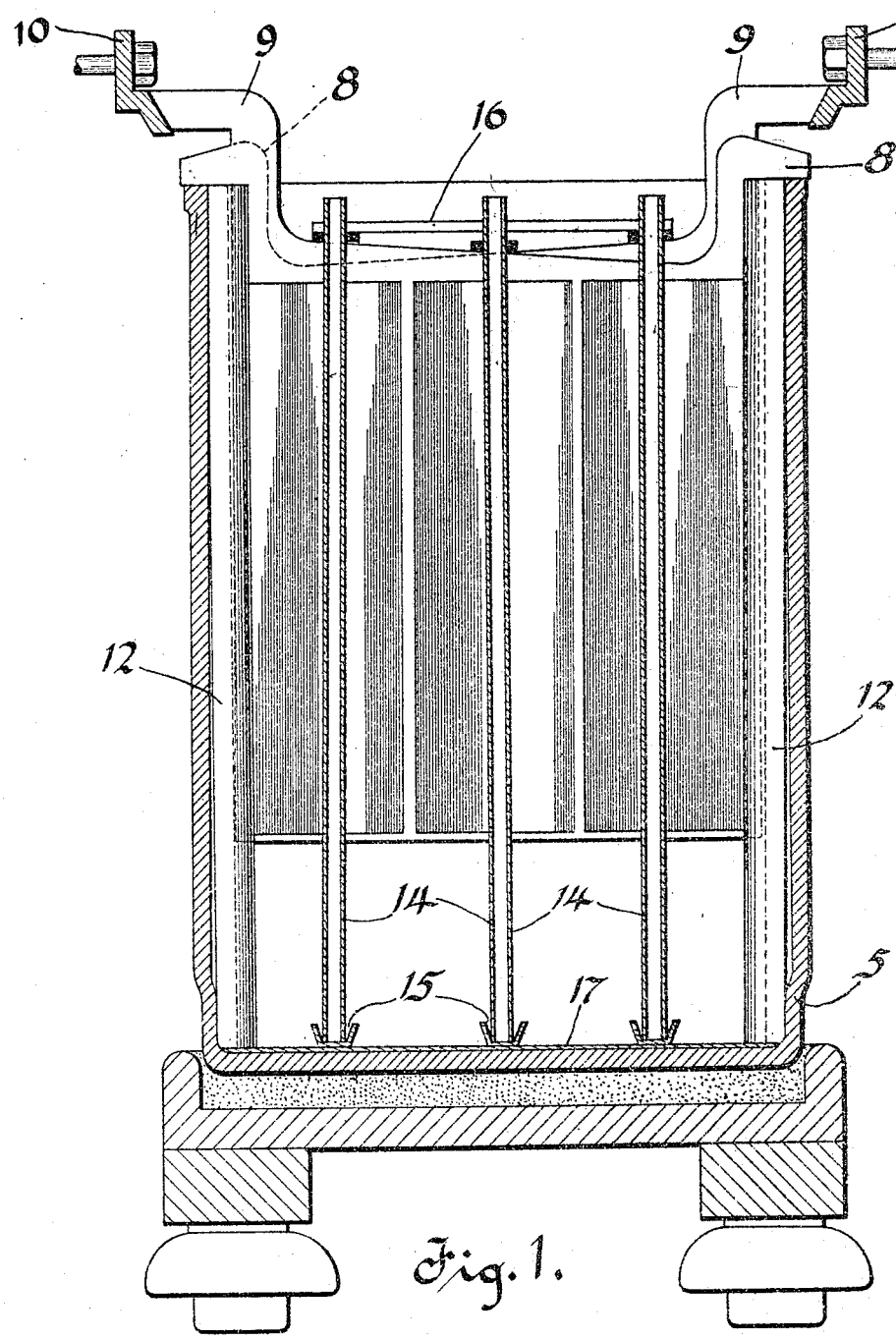

L. H. FLANDERS.
SPACER AND INSULATOR FOR STORAGE BATTERY ELECTRODES.
APPLICATION FILED AUG. 20, 1907.
950,319.
Patented Feb. 22, 1910.
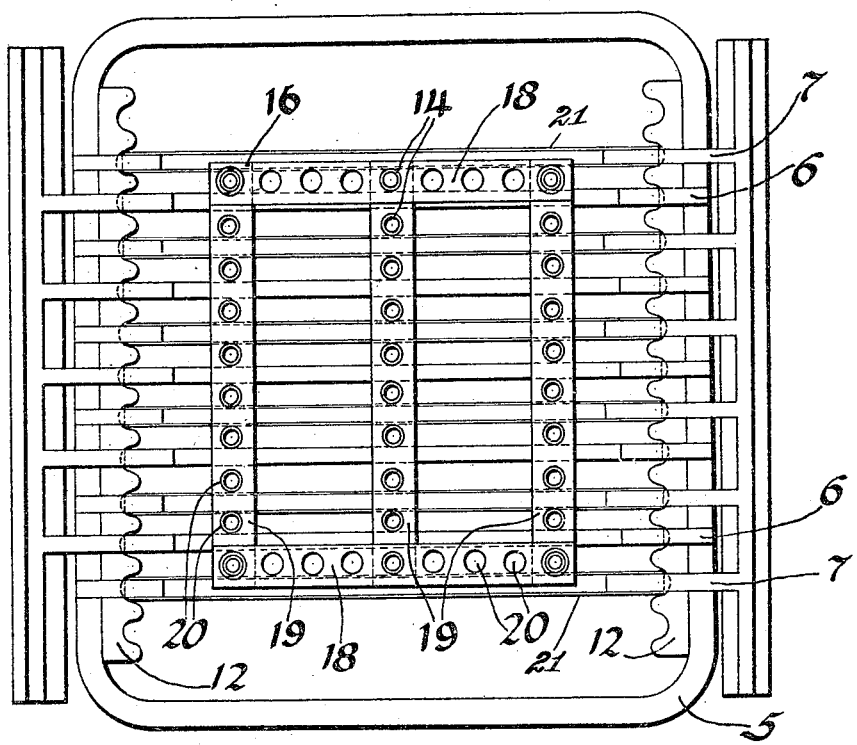
Fig. 2.
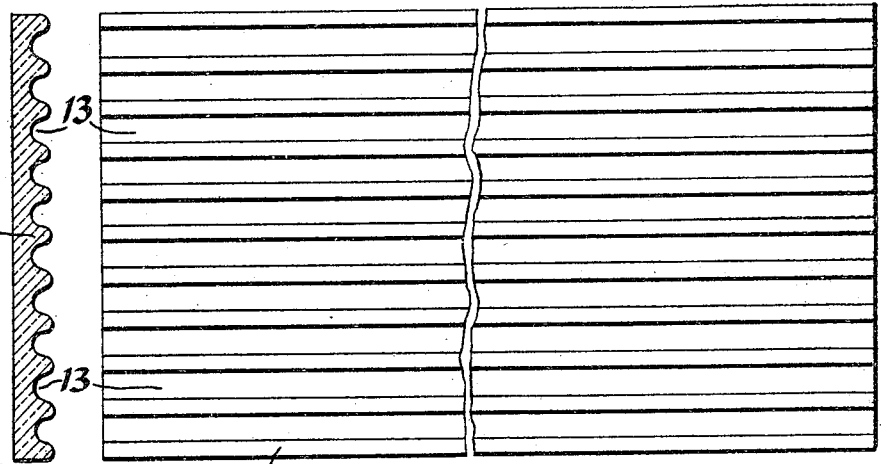
Fig. 3.
Fig. 4.

UNITED STATES PATENT OFFICE.

LOUIS H. FLANDERS, OF EDGEWOOD PARK, PENNSYLVANIA, ASSIGNOR, BY MESNE ASSIGNMENTS, TO WESTINGHOUSE STORAGE BATTERY COMPANY, A CORPORATION OF NEW YORK.

SPACER AND INSULATOR FOR STORAGE-BATTERY ELECTRODES.

950,319.  Specification of Letters Patent.  Patented Feb. 22, 1910.

Application filed August 20, 1907. Serial No. 389,389.

*To all whom it may concern:*

Be it known that I, LOUIS H. FLANDERS, a citizen of the United States, and a resident of Edgewood Park, in the county of Allegheny and State of Pennsylvania, have made a new and useful Invention in Spacers and Insulators for Storage-Battery Electrodes, of which the following is a specification.

This invention relates to secondary batteries and more particularly to means for separating and spacing the electrodes of such batteries.

An object of this invention is the production of means for spacing, separating, effectively insulating and stiffening the electrodes against buckling.

In the drawings accompanying this application and forming a part thereof: Figure 1 is a sectional elevation of a secondary battery cell illustrating an embodiment of my invention; Fig. 2 is a plan view of Fig. 1; and Figs. 3 and 4 are respectively sectional and side elevations of a detail of my invention.

The cell illustrated as embodying my invention comprises a container tank 5, alternately arranged positive and negative electrodes 6 and 7, and means for spacing and separating the electrodes. Each electrode is provided at one side on its upper edge with a supporting lug 8 and at the other side with a combination terminal and supporting lug 9. The electrodes are arranged in the tank so that all the terminal lugs of the negative electrodes are located on one side of the tank and all the terminal lugs of the positive electrodes are located on the other side of the tank. The terminal lugs of the positive plates are rigidly secured to a terminal strap 10 and the terminals of the negative electrodes are secured to a terminal strap 11, the connections being made, preferably, by autogenous soldering. Glass plates 12 are supported on the bottom of the container tank and are located between the lateral edges of the electrodes and the adjacent walls of the tank. The plates 12 are of such length that their upper edges are in the same plane as the upper edges of the container tank and they coöperate with them in supporting the electrodes. Grooves 13 are provided on one side of each plate 12, which serve as spacers for the electrodes, an edge of each electrode extending into each groove. The grooves are of such width and are so spaced that the edges of the electrodes are supported by the plates 12 and are effectively insulated against bridging. The plates may readily be replaced by providing grooves in the walls of the container tank which are opposite the lateral edges of the plates. Such a construction is, of course, only permissible where the tank is constructed of insulating material. In case the grooved plates are used in connection with lead lined or similar tanks the plates are made sufficiently heavy to support the entire weight of the electrodes.

In addition to the plate separators the cell is provided with an auxiliary means for separating the electrodes and maintaining their intermediate portions at a safe distance apart. The auxiliary separating means consists of a series of insulating rods 14 which are located between adjacent electrodes and which are supported at their lower ends in grooves 15, located at the bottom of the cell and extending transversely of the electrodes. The rods 14 extend vertically between the adjacent electrodes and are secured in place at their upper ends by means of a frame 16 constructed of insulating material and supported upon the upper edges of the electrodes. The grooves 15, as shown in the drawings, are formed in any suitable manner on a lead plate 17, which is located in the bottom of the tank, and the frame 16 is composed of end pieces 18 which extend transversely of the grooves and cross pieces 19, which extend parallel to the grooves and transversely of the electrodes. The frame is provided with holes 20, arranged to receive the upper ends of the rods 14 and spaced with reference to the spacing of the electrodes. In the drawings three rods are shown located between each pair of adjacent plates, although the number of rods may be varied for different sizes of electrodes. The rods are tubular in shape, preferably of glass, and are of such diameter that the electrodes afford each other mutual support by means of them.

In addition to the glass separator rods, I have found it advantageous to inclose each negative electrode between sheets of thin wood; that is, wood veneer. A sheet of the veneer 21 is located on each side of the negative plate between it and the adjacent separator rods and its edges are held in place between the edges of the electrode and the sides of the grooves of the plates 12. Either the positive, negative, or both sets of electrodes may be inclosed between the wood sheets. I inclose the negative electrodes, however, for the reason that they are lighter and there is, therefore, more room in the grooves of the plates 12 for the edges of the wood sheath.

The grooved plates 12 rigidly support the edges of the electrodes and maintain them in absolute relative positions, while the rods 14 support the intermediate portions of the electrodes and thereby stiffen them and materially overcome any tendency toward buckling. The plates 12, as before mentioned, overcome any tendency to bridge between the edges of the electrodes, and the wood sheets, while they are readily permeated by the electrolyte, prevent bridging between the electrodes, and in case buckling should occur, due to the breaking of one or more of the rods 14, they would effectively insulate the electrodes. The arrangement of the separators and the manner of supporting the electrodes prevents the electrodes from being displaced by vibrations or expansions to which the cells or electrodes may be subjected, and produces a cell in which there is substantially no opportunity for bridging between the electrodes or buckling of the electrodes.

In accordance with the provisions of the patent statutes I have described the principle of operation of my invention, together with the apparatus which I now consider to represent the best embodiment thereof, but I desire to have it understood that the apparatus shown is only illustrative and that the invention can be carried out by other means.

What I claim is:

1. In a secondary battery in combination with its electrodes and its container tank, grooved plates formed of insulating material for spacing and insulating the edges of the electrodes and within the grooves of which said edges lie, and wood sheet separators located between said electrodes and which extend into the same grooves as said electrodes.

2. In a secondary battery in combination with its electrodes and its container tank, removable end plates made from insulating material and serving as supports for said electrodes and grooved vertically for receiving the edges of the electrodes, removable separators lying adjacent to said electrodes and extending into the same grooves and means for holding said wood sheet separators against the surfaces of said electrodes.

3. In a secondary battery, a container tank, grooved removable plates formed from insulating material located on opposite sides of said tank, electrodes, the edges of which lie within the grooves of said plates and which are provided with projecting lugs resting on the top of said plates whereby said electrodes are supported, removable porous separators located between adjacent electrodes and extending into the grooves of said plates and means for holding said separators in contact with said electrodes.

In testimony whereof, I have hereunto subscribed my name this 17th day of August, 1907.

LOUIS H. FLANDERS.

Witnesses:
CHARLES W. McGHEE,
R. P. McINTYRE.